(12) United States Patent
Lee et al.

(10) Patent No.: US 12,345,452 B2
(45) Date of Patent: Jul. 1, 2025

(54) COMBINATION VALVE UNIT AND VEHICLE HEAT PUMP SYSTEM

(71) Applicant: Hanon Systems, Daejeon (KR)

(72) Inventors: Jae Min Lee, Daejeon (KR); Young Man Kim, Daejeon (KR); In Hyeok Kim, Daejeon (KR); Kyeong Cheol Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 228 days.

(21) Appl. No.: 17/788,557

(22) PCT Filed: Jan. 25, 2021

(86) PCT No.: PCT/KR2021/000945
§ 371 (c)(1),
(2) Date: Jun. 23, 2022

(87) PCT Pub. No.: WO2021/153957
PCT Pub. Date: Aug. 5, 2021

(65) Prior Publication Data
US 2023/0048724 A1    Feb. 16, 2023

(30) Foreign Application Priority Data

Jan. 30, 2020  (KR) .................. 10-2020-0010988

(51) Int. Cl.
| | |
|---|---|
| *F25B 41/31* | (2021.01) |
| *B60H 1/32* | (2006.01) |
| *F25B 41/37* | (2021.01) |

(52) U.S. Cl.
CPC ............... *F25B 41/31* (2021.01); *B60H 1/32* (2013.01); *F25B 41/37* (2021.01); *B60H 2001/3297* (2013.01)

(58) Field of Classification Search
CPC .......... F25B 41/31; F25B 41/37; F25B 41/39; F25B 2400/0409; F25B 2400/0411;
(Continued)

(56) References Cited

U.S. PATENT DOCUMENTS 5,826,438 A * 10/1998 Ohishi .................. B60H 1/323
236/92 B

FOREIGN PATENT DOCUMENTS

| CN | 105874288 A | * | 8/2016 | ......... B60H 1/00921 |
| CN | 107191622 A | | 9/2017 | |

(Continued)

OTHER PUBLICATIONS

Written Opinion of the International Searching Authority and International Search Report for International Application No. PCT/KR2021/000945, mailed May 18, 2021, 10 page(s), English Translation of International Search Report Included.

*Primary Examiner* — Kun Kai Ma
(74) *Attorney, Agent, or Firm* — Dickinson Wright PLLC

(57) ABSTRACT

Provided is a combination valve unit having an improved structure and capable of performing both a pressure relief function for cooling and a pressure relief function for dehumidification. In addition, disclosed is a vehicle heat pump system capable of improving dehumidification performance by actively controlling the refrigerant flow distribution. The combination valve unit serves as a refrigerant throttling means in a vehicle heat pump system, and forms the inlet for a cooling pressure relief unit for performing indoor cooling and the inlet for a dehumidification pressure relief unit for performing indoor dehumidification, respectively.

15 Claims, 9 Drawing Sheets

(58) Field of Classification Search
CPC .... F25B 6/04; F25B 5/04; F25B 41/30; F25B 41/335
See application file for complete search history.

(56) References Cited

FOREIGN PATENT DOCUMENTS

| | | | | | |
|---|---|---|---|---|---|
| EP | 3686515 | A1 | * | 7/2020 | .............. F24F 5/001 |
| EP | 4265981 | A1 | * | 10/2023 | ........... F24D 10/003 |
| JP | H09303899 | A | * | 11/1997 | |
| JP | 2001317839 | A | | 11/2001 | |
| JP | 2012233676 | A | * | 11/2012 | ......... B60H 1/00899 |
| KR | 1020100132715 | A | | 12/2010 | |
| KR | 1020120093670 | A | | 8/2012 | |
| KR | 1020140083295 | A | | 7/2014 | |
| KR | 20210077358 | A | * | 6/2021 | |
| WO | WO-2018159150 | A1 | * | 9/2018 | ................ F25B 1/00 |

* cited by examiner

PRIOR ART though a decompression device for cooling and a decompression device for dehumidification. However, Merkur MARK will be known as the Merkur MARK.

COMBINATION VALVE UNIT AND VEHICLE HEAT PUMP SYSTEM

CROSS-REFERENCE TO RELATED APPLICATIONS

This application is a U.S. National Stage of International Patent Application Serial No. PCT/KR2021/000945, filed Jan. 25, 2021, which claims the benefit of Korean Patent Application Serial No. 10-2020-0010988, filed Jan. 30, 2020. The entire disclosures of each of the above applications are incorporated herein by reference.

TECHNICAL FIELD

The present invention relates to a combination valve unit and, more specifically, to a combination valve unit for performing a decompression function for cooling and a decompression function for dehumidification, and a heat pump system for a vehicle having the same.

BACKGROUND ART

In general, an air conditioner for a vehicle includes a cooling system for cooling the interior of the vehicle, and a heating system for heating the interior of the vehicle. The cooling system converts the air, which passes the outside of an evaporator, into cold air by exchanging heat between the air and refrigerant, which flows inside the evaporator, from the evaporator side to cool the interior of the vehicle. The heating system converts the air, which passes the outside of a heater core of a cooling water cycle, into warm air by exchanging heat between the air and cooling water, which flows inside the heater core, from the heater core side to heat the interior of the vehicle.

In the meantime, differently from the air conditioner for the vehicle, a heat pump system which is capable of selectively carrying out cooling and heating by changing a flow direction of refrigerant using one refrigerant cycle is disclosed. The heat pump system includes, for instance, two heat exchangers, namely, an indoor heat exchanger mounted inside an air-conditioning case to exchange heat with air blown to the interior of the vehicle and an outdoor heat exchanger mounted outside the air-conditioning case to exchange heat, and a direction-changing valve for changing a flow direction of refrigerant. Therefore, the indoor heat exchanger serves as a heat exchanger for cooling when the heat pump system is operated in a cooling mode according to the flow direction of refrigerant by the direction-changing valve and also serves as a heat exchanger for heating when the heat pump system is operated in a heating mode.

FIG. 1 is a block diagram of a conventional heat pump system for a vehicle. The conventional heat pump system for a vehicle includes a compressor 30, an indoor heat exchanger 32, a first expansion valve 34, an outdoor heat exchanger 48, and an evaporator 60.

The compressor 30 sucks and compresses refrigerant and discharges the refrigerant in a gaseous state of high temperature and high pressure. The indoor heat exchanger 32 radiates heat of the refrigerant discharged from the compressor 30. The first expansion valve 34 expands the refrigerant passing through the indoor heat exchanger 32, and the outdoor heat exchanger 48 exchanges heat between outdoor air and the refrigerant passing through the first expansion valve 34. The evaporator 60 evaporates the refrigerant.

The evaporator 60 and the indoor heat exchanger 32 are sequentially mounted in the air conditioning case 10 in an air flow direction. A temperature door 12 is disposed between the evaporator 60 and the indoor heat exchanger 32 to control an air flow rate between a warm air passage and a cold air passage and adjust temperature of the air. A blower 20 for blowing indoor air or outdoor air to an air passage of the air conditioning case 10 is disposed on one side of the air conditioning case 10.

An accumulator 62 is further provided between the evaporator 60 and the compressor 30 to separate the refrigerant flowing into the compressor 30 into a gaseous phase and a liquid phase. Furthermore, an internal heat exchanger 50 is further provided between the outdoor heat exchanger 48 and the evaporator 60 to exchange heat between the refrigerant supplied to the evaporator 60 and the refrigerant returning to the compressor 30. Meanwhile, the refrigerant passing through the indoor heat exchanger 32 selectively flows into the first expansion valve 34 by a first bypass valve 36 mounted in parallel with the first expansion valve 34.

Additionally, a second expansion valve 56 is provided upstream of the evaporator 60 to selectively expand the refrigerant supplied to the evaporator 60. A second bypass valve 58 is disposed between the outdoor heat exchanger 48 and the second expansion valve 56 and is mounted in parallel with the second expansion valve 56 to selectively connect an outlet of the outdoor heat exchanger 48 and an inlet of the accumulator 62.

In an air conditioner mode (cooling mode), the first bypass valve 36 and the second expansion valve 56 are open, and the first expansion valve 34 and the second bypass valve 58 are closed. The temperature door 12 opens the cold air passage. The refrigerant discharged from the compressor 30 passes through the indoor heat exchanger 32, the first bypass valve 36, the outdoor heat exchanger 48, the second expansion valve 56, the evaporator 60, and the accumulator 62 in order, and then, returns to the compressor 30.

In a heat pump mode (heating mode), the first bypass valve 36 and the second expansion valve 56 are closed, and the first expansion valve 34 and the second bypass valve 58 are opened. In addition, the temperature door 12 opens the warm air passage. The refrigerant discharged from the compressor 30 passes through the indoor heat exchanger 32, the first expansion valve 34, the outdoor heat exchanger 48, the second bypass valve 58, and the accumulator 62 in order, and then, returns to the compressor 30. In this instance, the indoor heat exchanger 32 serves as a heater, and the outdoor heat exchanger 48 serves as an evaporator.

Meanwhile, during dehumidification in the heat pump mode, the refrigerant is discharged from the compressor 30 and passed through the indoor heat exchanger 32. After that, some of the refrigerant passing through the first expansion valve 34 passes through the outdoor heat exchanger 48, the second bypass valve 58, and the accumulator 62 in order, and then, returns to the compressor 30. Moreover, some of the refrigerant passing through the first expansion valve 34 flows to the evaporator 60 to dehumidify the interior of the vehicle.

The conventional heat pump system has a disadvantage in that it is difficult to actively control distribution of a refrigerant flow rate since the refrigerant expanded in the first expansion valve 34 diverges from a low pressure line in the dehumidification mode.

Additionally, the conventional heat pump system has another disadvantage in that the number of components increases and manufacturing costs are increased since the expansion valve and a pipe must be connected and a decompression device for cooling and a decompression device for dehumidification must be installed additionally.

DISCLOSURE

Technical Problem

Accordingly, the present invention has been made in view of the above-mentioned problems occurring in the related art, and it is an object of the present invention to provide a combination valve unit with an improved structure capable of performing a decompression function for cooling and a decompression function for dehumidification, and a heat pump system for a vehicle capable of improving dehumidification performance by actively controlling the distribution of refrigerant flow rate.

Technical Solution

To accomplish the above-mentioned objects, according to the present invention, there is provided a combination valve unit, which is a means for throttle refrigerant of a heat pump system for a vehicle, the combination valve unit forming an inlet of a decompression unit for cooling the interior of a vehicle and an inlet of a decompression unit for performing dehumidification of the interior.

Moreover, the decompression unit for cooling includes a thermal expansion valve, the decompression unit for dehumidification includes an orifice, and the thermal expansion valve and the orifice are formed integrally with one valve body.

Furthermore, the decompression unit for cooling has an expansion passage connected to a refrigerant line at an inlet side of an evaporator to expand the refrigerant, and a dehumidification line is connected to the decompression unit for dehumidification, and a bypass passage is disposed so that refrigerant flowing through the dehumidification line bypasses the expansion passage to be supplied to the evaporator.

Additionally, an orifice is formed integrally with the bypass passage.

In addition, the combination valve unit further includes: a first passage through which the refrigerant supplied to the evaporator flows and which has an expansion passage between an inlet and an outlet; a second passage having an inlet and an outlet through which the refrigerant discharged from the evaporator flows; a valve body controlling a flow rate of the refrigerant passing through the expansion passage; a rod sliding according to a temperature change of the refrigerant to and lifting the valve body up and down; and a bypass passage formed to communicate with the outlet of the first passage which is the downstream side of the expansion passage.

Moreover, the bypass passage is composed of an orifice having a passage width which gets narrower and gets wider.

Furthermore, an angle formed between a center line of the inlet and a center line of the outlet of the first passage is 90 degrees, and the bypass passage is formed concentrically with the outlet of the first passage.

In another aspect of the present invention, provided is a heat pump system for a vehicle which includes: a compressor compressing and discharging refrigerant; a first heat exchanger radiating heat of the refrigerant discharged from the compressor; a first expansion valve selectively expanding the refrigerant passing through the first heat exchanger; a second heat exchanger exchanging heat between the refrigerant passing through the first expansion valve and a heat medium; and an evaporator disposed in an air conditioning case to exchange heat between the refrigerant and air in the air conditioning case, the heat pump system further including: a combination valve unit having a decompression unit for cooling the refrigerant supplied to the evaporator and a decompression unit for dehumidification.

Moreover, the heat pump system further includes: a refrigerant line circulating the refrigerant to the compressor, the first heat exchanger, the first expansion valve, the second heat exchanger, the combination valve unit, and the evaporator; a first bypass line diverging between the second heat exchanger and the combination valve unit and bypassing the evaporator; and a dehumidification line diverging from the refrigerant line and bypassing the second heat exchanger to supply the refrigerant to the evaporator.

Furthermore, the dehumidification line diverges upstream from the first expansion valve.

Additionally, the heat pump system further includes a first valve controlling a flow rate of the refrigerant toward the dehumidification line.

In addition, the first valve is a ball valve type capable of proportionally controlling opening variables of the dehumidification line.

Moreover, the refrigerant line and the dehumidification line are connected to different inlets of the combination valve unit.

Furthermore, the decompression unit for cooling has an expansion passage connected to the refrigerant line of an inlet side of the evaporator to expand the refrigerant. A dehumidification line is connected to the decompression unit for dehumidification, and a bypass passage is disposed such that the refrigerant flowing through the dehumidification line bypasses the expansion passage to be supplied to the evaporator, and an orifice is formed integrally in the bypass passage.

Additionally, a second valve is disposed at a branch point between the refrigerant line and the first bypass line downstream of the second heat exchanger to control a flow of the refrigerant toward the evaporator and a flow of the refrigerant toward the first bypass line, and a second bypass line diverging between the second valve and the combination valve unit to bypass the evaporator, and a second expansion valve and a chiller are disposed in the second bypass line.

In addition, in a heating and dehumidification mode, some of the refrigerant of the refrigerant line passing through the compressor and the first heat exchanger circulates the first expansion valve, the second heat exchanger and the compressor, and some of the refrigerant is expanded while passing through the orifice of the combination valve unit through the dehumidification line, and then, circulates the compressor through the evaporator.

In a further aspect of the present invention, provided is a heat pump system for a vehicle which includes: a compressor compressing and discharging refrigerant; a first heat exchanger radiating heat of the refrigerant discharged from the compressor; a first expansion valve selectively expanding the refrigerant passing through the first heat exchanger; a second heat exchanger exchanging heat between the refrigerant passing through the first expansion valve and a heat medium; and an evaporator disposed in an air conditioning case to exchange heat between the refrigerant and air in the air conditioning case, the heat pump system further including: a refrigerant line circulating the refrigerant to the compressor, the first heat exchanger, the first expansion valve, the second heat exchanger, the combination valve unit, and the evaporator; a first bypass line diverging between the second heat exchanger and the combination valve unit and bypassing the evaporator; and a dehumidification line diverging from the refrigerant line and bypassing the second heat exchanger to supply the refrigerant to the evaporator, wherein the dehumidification line diverges upstream from the first expansion valve.

Advantageous Effects

The combination valve unit and the heat pump system for a vehicle according to the present invention can reduce the number and weight of components, simply realize the structure of a pipe, and simplify a connection structure between the pipe and a valve.

Moreover, the combination valve unit and the heat pump system for a vehicle according to the present invention can more actively control the flow rate of refrigerant diverging toward the evaporator, and secure a sufficient refrigerant flow rate toward the evaporator in various conditions so as to improve dehumidification performance.

In addition, the combination valve unit and the heat pump system for a vehicle according to the present invention can simplify the connection structure among the combination valve unit, the pipe, and the evaporator, and improve assemblability.

MODE FOR INVENTION

Figure 1:
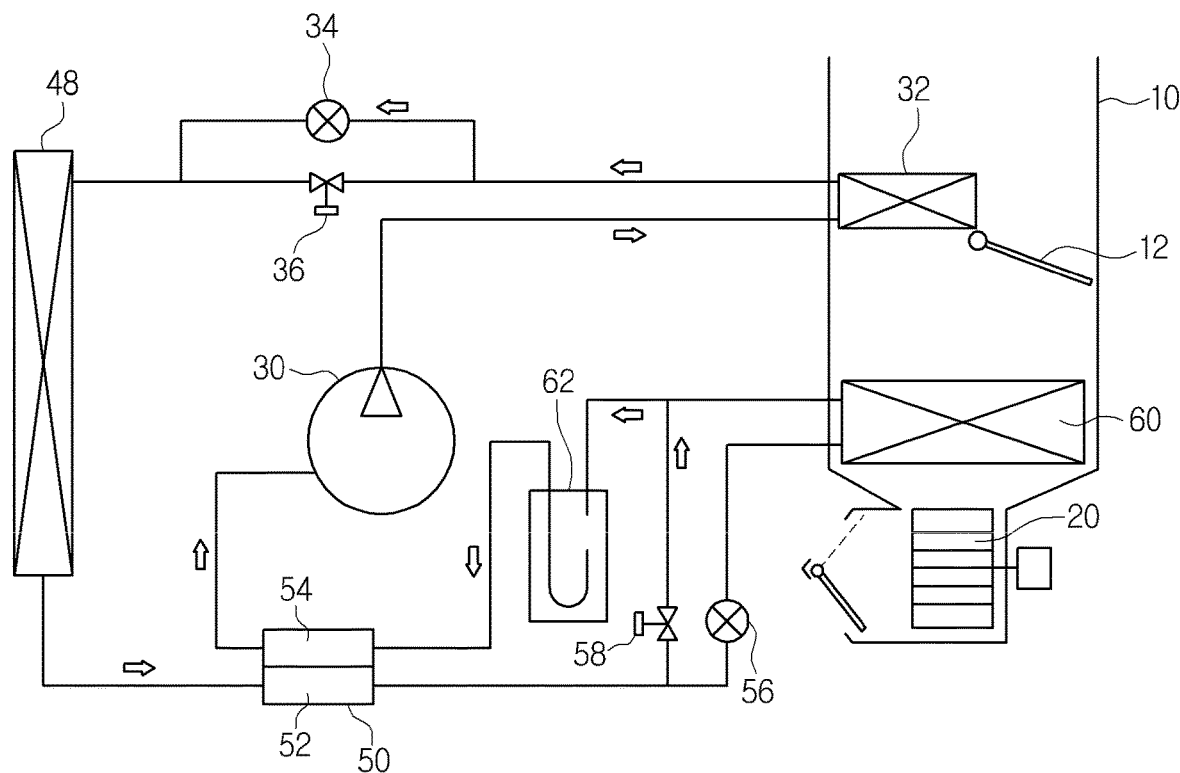
FIG. 1 is a block diagram of a conventional heat pump system for a vehicle.
Figure 2:
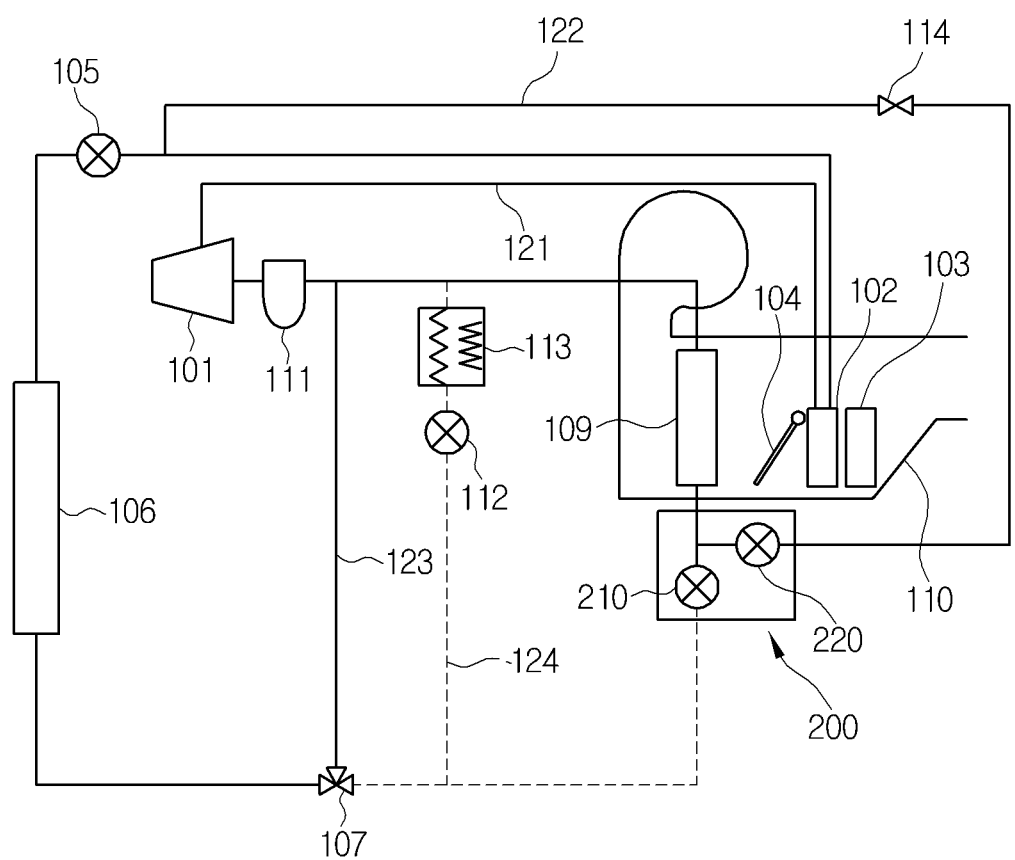
FIG. 2 is a block diagram of a heat pump system for a vehicle according to an embodiment of the present invention.
Figure 3:
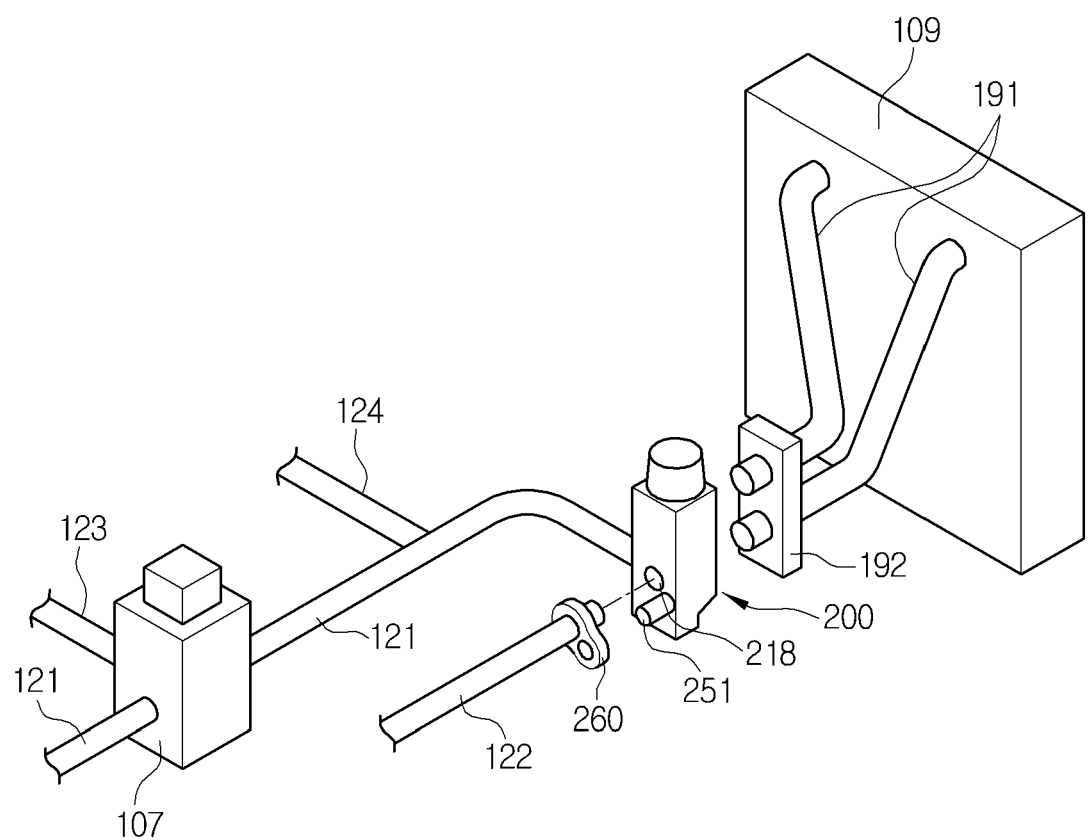
FIG. 3 is a perspective view illustrating an installation area of a combination valve unit according to an embodiment of the present invention.
Figure 4:
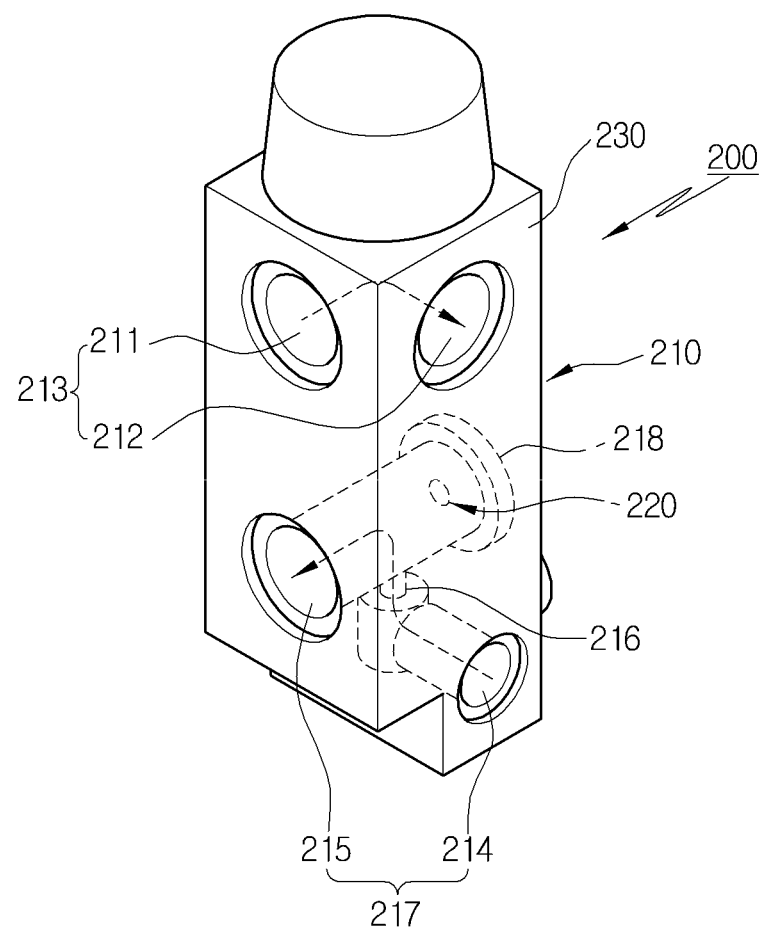
FIGS. 4 and 5 are perspective views illustrating the combination valve unit according to an embodiment of the present invention.
Figure 5:
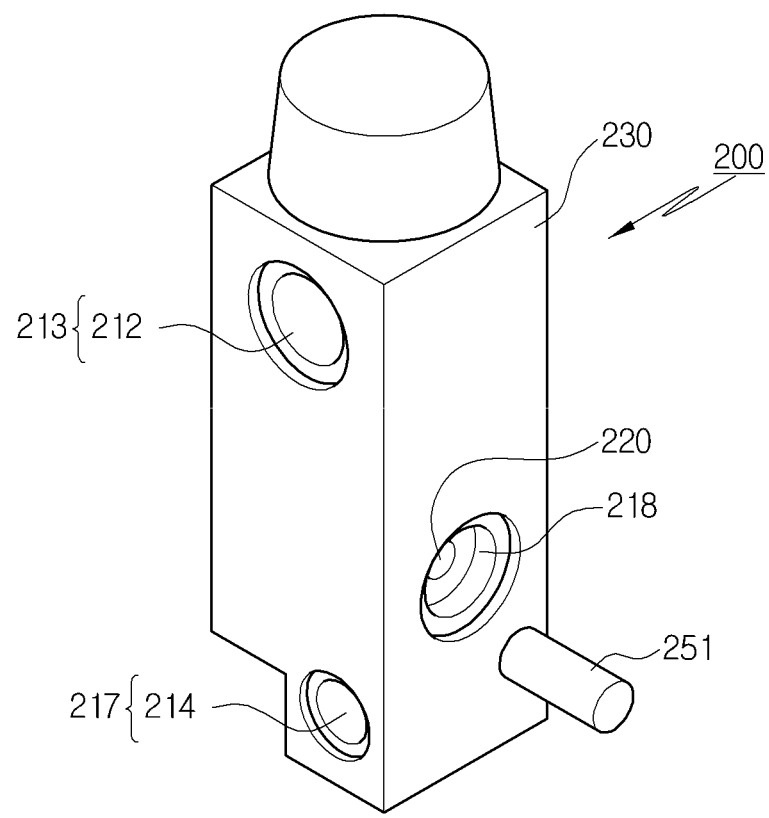
Figure 6:
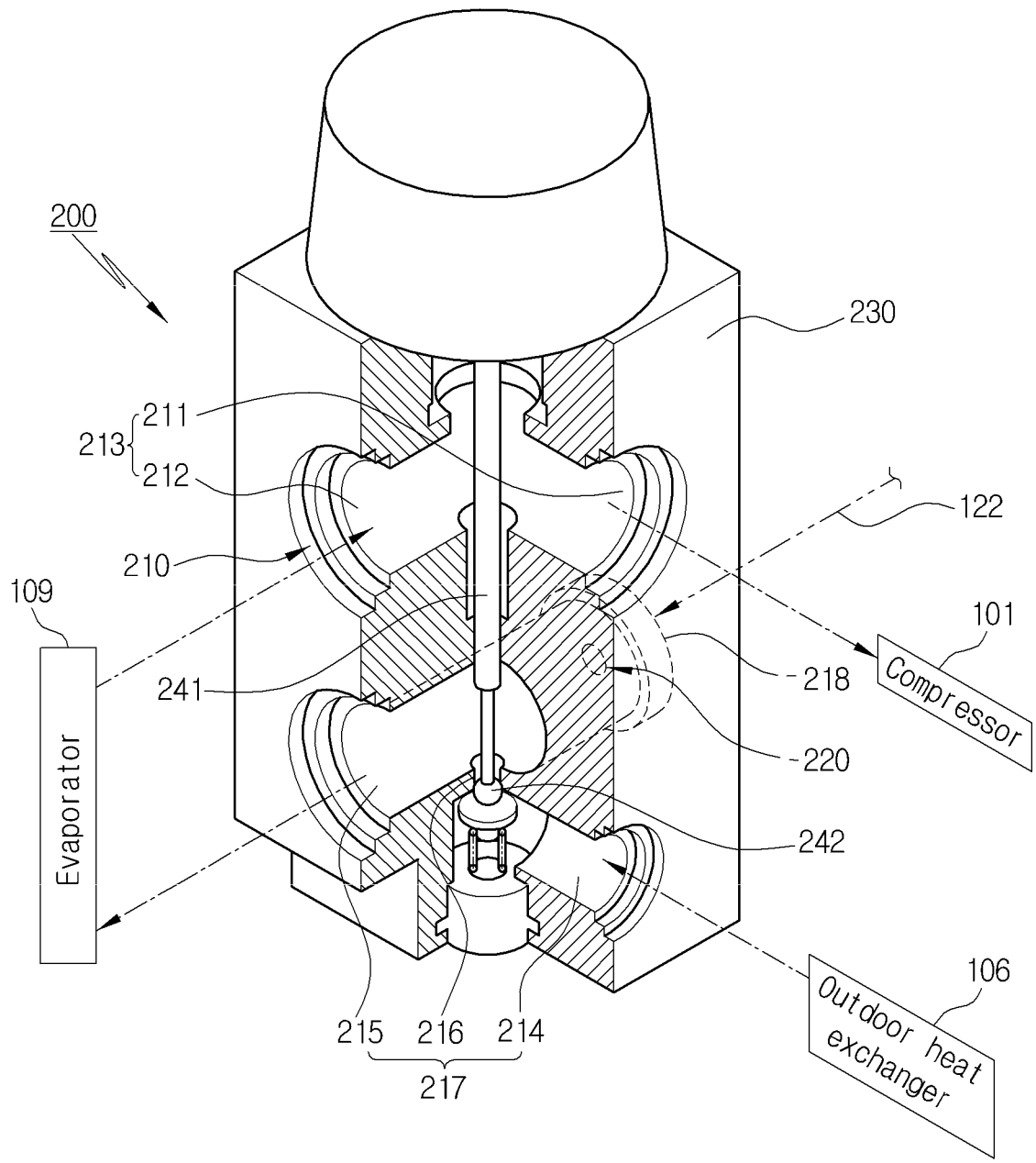
FIG. 6 is a partially cross-sectional view of the combination valve unit according to an embodiment of the present invention.

Hereinafter, technical structures of a combination valve unit and a heat pump system for a vehicle according to the present invention will be described in detail with reference to the accompanying drawings.

Referring to FIGS. 2 to 6, the heat pump system for a vehicle includes a compressor 101, a first heat exchanger 102, a first expansion valve 105, a second heat exchanger 106, a combination valve unit 200, and an evaporator 109 which are sequentially provided in a refrigerant line 121 in a refrigerant flow direction.

The compressor 101 sucks and compresses refrigerant and discharges the refrigerant in a gaseous state of high temperature and high pressure. The first heat exchanger 102 radiates heat of the refrigerant discharged from the compressor 101. The first expansion valve 105 expands the refrigerant passing through the first heat exchanger 102. The second heat exchanger 106 exchanges heat between heat medium and the refrigerant passing through the first expansion valve 105. That is, the second heat exchanger 106 exchanges heat between outdoor air and the refrigerant passing through the first expansion valve 105. The evaporator 109 evaporates the refrigerant.

The evaporator 109 and the first heat exchanger 102 are sequentially mounted in the air conditioning case 110 in an air flow direction. An electric heater 103 such as a PTC may be further provided downstream of the first heat exchanger 102. A temperature door 104 is disposed between the evaporator 109 and the first heat exchanger 102 to control an air flow rate between a warm air passage and a cold air passage and adjust indoor discharge temperature of the air. An accumulator 111 is further provided between the evaporator 109 and the compressor 101 to separate the refrigerant flowing into the compressor 101 into a gaseous phase and a liquid phase.

The first heat exchanger 102 exchanges heat between the refrigerant discharged from the compressor 101 and air in the air conditioning case 110 to heat the air. The first expansion valve 105 selectively expands the refrigerant passing through the first heat exchanger 102, and the refrigerant is expanded after passing through the first expansion valve 105 or bypasses the first expansion valve 105. The evaporator 109 exchanges heat between the refrigerant and the air in the air conditioning case 110 to cool the air.

The combination valve unit 200 is a means for throttling the refrigerant of the heat pump system for a vehicle, and includes a decompression unit 210 for cooling the refrigerant supplied to the evaporator 109 and a decompression unit 220 for dehumidification. The structure of the combination valve unit 200 will be described in detail later.

The heat pump system for a vehicle includes a refrigerant line 121, a first bypass line 123, a dehumidification line 122, and a second bypass line 124. The refrigerant line 121 circulates the refrigerant to the compressor 101, the first heat exchanger 102, the first expansion valve 105, the second heat exchanger 106, the combination valve unit 200, and the evaporator 109. The first bypass line 123 diverges between the second heat exchanger 106 and the complex valve unit 200 to bypass the evaporator 109. The dehumidification line 122 diverges from the refrigerant line 121 and bypasses the second heat exchanger 106 and supplies the refrigerant to the evaporator 109.

The dehumidification line 122 includes a first valve 114. The first valve 114 controls the flow rate of the refrigerant flowing through the dehumidification line 122. Furthermore, a second valve 107 is provided at a branch point between the refrigerant line 121 and the first bypass line 123 downstream of the second heat exchanger 106. The second valve 107 controls the flow of refrigerant toward the evaporator 109 and the flow of the refrigerant toward the first bypass line 123.

That is, the second valve 107 is provided at the branch point between the refrigerant line 121 and the first bypass line 123 to determine whether the refrigerant passing through the second heat exchanger 106 is circulated to the compressor 101 through the first bypass line 123 or passes the combination valve unit 200 through the refrigerant line 121. The second valve 107 may be formed in a three-way valve type.

The second bypass line 124 diverges between the second valve 107 and the combination valve unit 200 to bypass the evaporator 109. The second bypass line 124 includes a second expansion valve 112 and a chiller 113.

The second expansion valve 112 is provided upstream of the chiller 113 to expand the refrigerant. The second expansion valve 112 may include an electronic expansion valve. The chiller 113 may be configured to exchange heat between the refrigerant of the second bypass line 124 and coolant of a separate coolant line. In this instance, the coolant line may be configured to circulate a battery, an electronic component, and the like of the electric vehicle.

The combination valve unit 200 is configured to form an inlet of a decompression unit 210 for cooling the interior and an inlet of a decompression unit 220 for dehumidifying the interior. Specifically, the decompression unit 210 for cooling includes a thermal expansion valve, and the decompression unit 220 for dehumidification includes an orifice. In addition, the thermal expansion valve and the orifice are integrally formed in one valve body 230.

As described above, the expansion valve body of a TXV type has an orifice shape formed integrally, and one valve body 230 has the decompression unit for cooling and the decompression unit 220 for dehumidification, thereby reducing the number of components, weight, and manufacturing costs, simplifying the structure of piping, and also simplifying the connection structure between the piping and the valve.

More specifically, the decompression unit 210 for cooling includes an expansion passage 216 connected to a refrigerant line of an inlet of the evaporator 109 to expand the refrigerant. Additionally, a dehumidification line 122 is connected to the decompression unit 220 for dehumidification. The decompression unit 220 for dehumidification includes a bypass passage 218. The bypass passage 218 allows the refrigerant flowing through the dehumidification line 122 to bypass the expansion passage 216 and to be supplied to the evaporator 109.

The combination valve unit 200 includes a first passage 217, a second passage 213, a valve body 242, a rod 241, and a bypass passage 218. The first passage 217 flows the refrigerant supplied to the evaporator 109, and includes an expansion passage 216 between an inlet 214 and an outlet 215. The second passage 213 has an inlet 211 and an outlet 212 through which the refrigerant discharged from the evaporator 109 flows.

The valve body 242 regulates the flow rate of refrigerant passing through the expansion passage 216. The rod 241 slides according to a temperature change of the refrigerant to lift the valve body 242. The bypass passage 218 is formed to communicate with the outlet 215 of the first passage 217 downstream of the expansion passage 216. In this instance, an angle between a center line of the inlet 214 of the first passage 217 and a center line of the outlet 215 is 90°. In addition, the bypass passage 218 is formed concentrically with the outlet 215 of the first passage 217.

That is, the decompression unit 210 for cooling expands the refrigerant passing through the second heat exchanger 106 in the cooling mode to make a liquid (wet saturation) state of low temperature and low pressure, and then, supplies the refrigerant to the evaporator 109. The valve body 242 adjusts the degree of opening of the expansion passage 216 to adjust a flow rate of the refrigerant passing through the expansion passage 216. The rod 241 moves the valve body 242 upward and downward according to a temperature change of the refrigerant of the outlet side passing through the expansion passage 216. The upper end of the valve body 230 is provided with a diaphragm displaced according to the temperature change of the refrigerant flowing through the second passage 213, and the rod 241 is lifted and lowered according to the displacement of the diaphragm.

The refrigerant line 121 and the dehumidification line 122 are connected to different inlets of the combination valve unit 200. That is, the refrigerant line 121 is connected to the inlet 214 of the first passage 217, and the dehumidification line 122 is connected to the inlet of the bypass passage 218. An orifice is integrally formed in the bypass passage 218. That is, the bypass passage is composed of an orifice of which the passage width gets narrower and wider.

The decompression unit 220 for dehumidification formed as an orifice expands the refrigerant flowing through the dehumidification line 122. Since the orifice is integrally formed in the bypass passage 218, it bypasses the expansion passage 216 of the decompression unit 210 for cooling, and does not affect the flow of the refrigerant in the expansion passage 216. In this instance, the orifice of the decompression unit 220 for dehumidification integrally formed in the valve body 230 communicates with the rear end passage of the expansion valve of the decompression unit 210 for cooling, and preferably is 3.0 mm or less in diameter.

The combination valve unit 200 is coupled to a flange 192 coupled to inlet and outlet pipes 191 of the evaporator 109. In this instance, the side surface of the valve body 230 having the outlet 215 of the first passage 217 and the inlet 211 of the second passage 213 is coupled to the flange 192 of the evaporator 109. Moreover, a stud bolt 251 is formed on the side surface of the valve body 230 having the bypass passage 218 to be coupled to the flange 260 coupled to the dehumidification line 122. Through such a configuration, the connection structure among the combination valve unit 200, the pipe and the evaporator can be simplified, and the assemblability is improved.

The dehumidification line 122 diverges upstream of the first expansion valve 105. That is, the dehumidification line 122 diverges from a high pressure line which is the front end of the first expansion valve 105, and is connected to the bypass passage 218 of the combination valve unit 200 so that the refrigerant flows to the evaporator 109. The refrigerant passing through the first heat exchanger 102 flows along the dehumidification line 122, is throttled after passing through the orifice, which is the decompression unit 220 for dehumidification, formed in the valve body 230 through the bypass passage 218, and then, flows into the evaporator 109 to be evaporated, thereby performing a defrosting operation in the interior of the vehicle.

As described above, since the decompression unit 220 for dehumidification of the orifice structure is formed integrally with one valve body 230 having the decompression unit 210 for cooling of the TXV type, the combination valve unit 200 does not require addition of additional components or a design change as only the bypass passage is formed in the TXV-type expansion valve which has been used conventionally and the orifice is formed integrally with the bypass passage. In the case of the TXV type expansion valve using the bypass passage, the orifice can be formed by modifying only some shape utilizing the existing holes without forming an additional hole for the bypass passage. Therefore, the combination valve unit 200 can secure the same level of cost competitiveness as the existing system.

As described above, the structure in which the dehumidification line 122 diverges from the high pressure part of the refrigerant line 121 upstream of the first expansion valve 105 can more actively control the flow rate of the refrigerant branching toward the evaporator 109, compared to the structure that the dehumidification line diverges from the low pressure part, which is downstream of the first expansion valve, and can improve dehumidification performance by securing a sufficient refrigerant flow rate to the evaporator 109 under various conditions.

Meanwhile, it is preferable that the first valve 114 for controlling the flow of the refrigerant of the dehumidification line 122 is a ball valve capable of proportionally controlling opening variables of the dehumidification line 122. The first valve 114 may proportionally adjust the area of the internal passage of the dehumidification line 122.

As described above, the first valve 114 is a two-way valve of a ball valve type, and can remedy the shortcomings of the orifice of the decompression unit 220 for dehumidification which is a fixed expansion device. That is, the first valve 114 of the ball valve type is relatively at the low price, and can further improve the shortcomings of the orifice which is insufficient in flow rate control capability.

Figure 7:
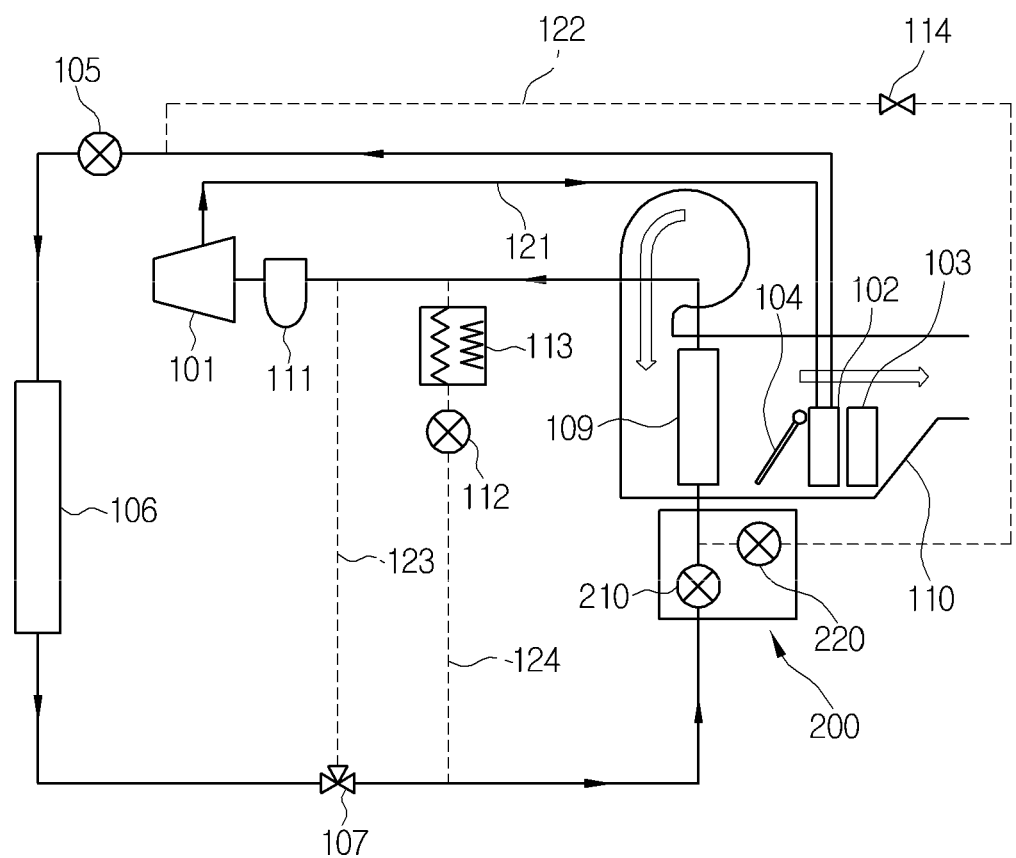
FIG. 7 is a view illustrating a cooling mode of a heat pump system for a vehicle according to an embodiment of the present invention.

Referring to FIG. 7, in the cooling mode, the refrigerant discharged from the compressor 101 is condensed after passing through the first heat exchanger 102, the first expansion valve 105, and the second heat exchanger 106. In this instance, the refrigerant is not expanded in the first expansion valve 105 and bypasses the first expansion valve 105. The refrigerant passing through the second heat exchanger 106 is introduced into the combination valve unit 200 under the control of the second valve 107.

The refrigerant flowing into the combination valve unit 200 is expanded while passing through the expansion passage 216 of the first passage 217 of the decompression unit 210 for cooling. After that, the refrigerant is evaporated while passing through the evaporator 109. After passing through the second passage 213 of the combination valve unit 200, the refrigerant passing through the evaporator 109 passes through the accumulator 111 and is circulated to the compressor 101. The temperature door 104 closes the warm air passage, and opens the cold air passage. The air heat-exchanged with the refrigerant while passing through the evaporator 109 is cooled to cool the interior of the vehicle.

Figure 8:
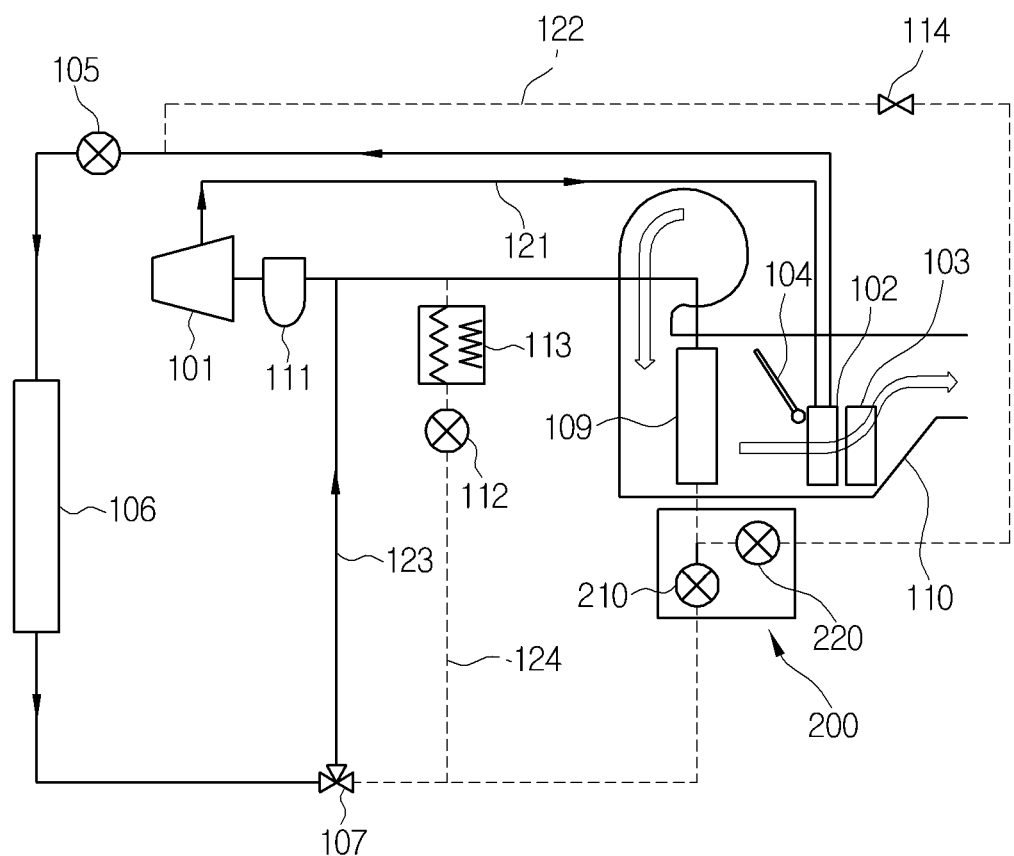
FIG. 8 is a view illustrating a heating mode of the heat pump system for a vehicle according to an embodiment of the present invention.

Referring to FIG. 8, in the heat pump mode (heating mode), the refrigerant discharged from the compressor 101 is condensed while passing through the first heat exchanger 102. The refrigerant passing through the first heat exchanger 102 is expanded while passing through the first expansion valve 105, and then is evaporated by passing through the second heat exchanger 106.

The refrigerant passing through the second heat exchanger 106 is circulated to the compressor 101 after passing through the accumulator 111 under the control of the second valve 107. The temperature door 104 opens the warm air passage and closes the cold air passage. The air heat-exchanged with the refrigerant while passing through the first heat exchanger 102 is heated to heat the interior of the vehicle.

Figure 9:
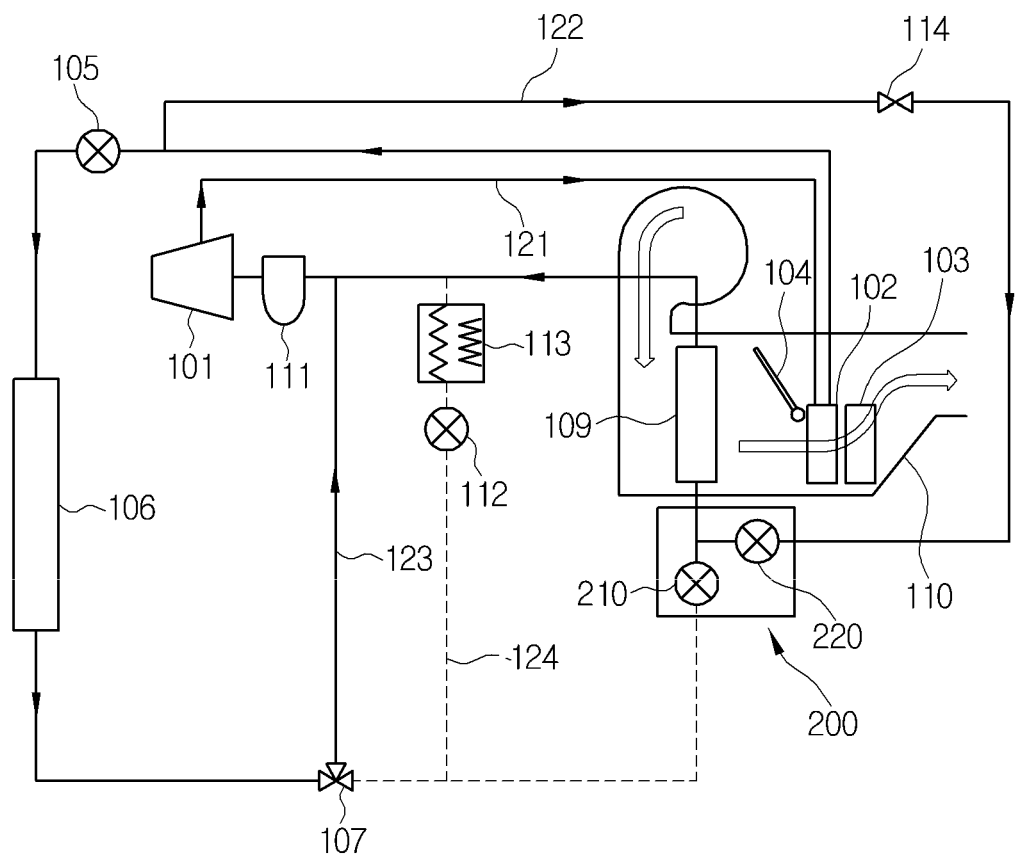
FIG. 9 is a view illustrating a dehumidification mode of the heat pump system for a vehicle according to an embodiment of the present invention.

Referring to FIG. 9, in the heating (heat pump) and dehumidification mode, some of the refrigerant of the refrigerant line 122 passing through the compressor 101 and the first heat exchanger 102 circulates the first expansion valve 105, the second heat exchanger 106, and the compressor 101. In addition, some of the refrigerant is expanded after passing through the orifice of the combination valve unit 200 through the dehumidification line 122, and then, the compressor 101 is circulated through the evaporator 109.

That is, the refrigerant discharged from the compressor 101 is condensed while passing through the first heat exchanger 102. Some of the refrigerant passing through the first heat exchanger 102 expands while passing through the first expansion valve 105, and then is evaporated after passing through the second heat exchanger 106. The refrigerant passing through the second heat exchanger 106 is circulated to the compressor 101 after passing through the accumulator 111 under the control of the second valve 107.

Some of the refrigerant passing through the first heat exchanger 102 flows into the dehumidification line 122, is controlled by manipulation of the first valve 114, and then, is introduced into the combination valve unit 200. The refrigerant flowing into the combination valve unit 200 is expanded after passing through the orifice of the decompression unit 220 for dehumidification, and then, is evaporated while passing through the evaporator 109. After the refrigerant passing through the evaporator 109 passes through the second passage 213 of the combination valve unit 200, the refrigerant passes through the accumulator 111 and is circulated to the compressor 101.

The temperature door 104 opens the warm air passage and closes the cold air passage, and the air heat-exchanged with the refrigerant while passing through the first heat exchanger 102 is heated to heat the interior of the vehicle. In this instance, air heat-exchanged with the refrigerant while passing through the evaporator 109 is dehumidified.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

The invention claimed is:

1. A combination valve unit, which is a means for throttling refrigerant of a heat pump system for a vehicle, the combination valve unit forming an inlet of a first decompression unit for cooling an interior of the vehicle, and an inlet of a second decompression unit for dehumidification for performing dehumidification of the interior of the vehicle;
   wherein the first decompression unit for cooling includes a thermal expansion valve, the second decompression unit for dehumidification includes an orifice, and the thermal expansion valve and the orifice are formed integrally with one valve body.

2. A combination valve unit, which is a means for throttling refrigerant of a heat pump system for a vehicle, the combination valve unit forming an inlet of a first decompression unit for cooling the interior of the vehicle, and an inlet of a second decompression unit for dehumidification for performing dehumidification of the interior of the vehicle;
   wherein the first decompression unit for cooling has an expansion passage connected to a refrigerant line at an inlet side of an evaporator to expand the refrigerant; and
   wherein a dehumidification line is connected to the second decompression unit for dehumidification, and a bypass passage is disposed so that refrigerant flowing through the dehumidification line bypasses the expansion passage to be supplied to the evaporator.

3. The combination valve unit according to claim 2, wherein an orifice is formed integrally with the bypass passage.

4. A combination valve unit, which is a means for throttling refrigerant of a heat pump system for a vehicle, the combination valve unit forming an inlet of a first decompression unit for cooling the interior of a vehicle, and an inlet of a second decompression unit for dehumidification for performing dehumidification of the interior;
   a first passage through which the refrigerant supplied to the evaporator flows and which has an expansion passage between an inlet and an outlet;

a second passage having an inlet and an outlet through which the refrigerant discharged from the evaporator flows;

a valve body controlling a flow rate of the refrigerant passing through the expansion passage;

a rod sliding according to a temperature change of the refrigerant to and lifting the valve body up and down; and a bypass formed to communicate with the outlet of the first passage which is the downstream side of the expansion passage.

5. The combination valve unit according to claim 4, wherein the bypass passage is composed of an orifice having a passage width which gets narrower and gets wider.

6. The combination valve unit according to claim 4, wherein an angle formed between a center line of the inlet and a center line of the outlet of the first passage is 90 degrees, and wherein the bypass passage is formed concentrically with the outlet of the first passage.

7. A heat pump system for a vehicle which includes: a compressor compressing and discharging refrigerant; a first heat exchanger radiating heat of the refrigerant discharged from the compressor; a first expansion valve selectively expanding the refrigerant passing through the first heat exchanger; a second heat exchanger exchanging heat between the refrigerant passing through the first expansion valve and a heat medium; and an evaporator disposed in an air conditioning case to exchange heat between the refrigerant and air in the air conditioning case, the heat pump system comprising:

a combination valve unit having a first decompression unit for cooling the refrigerant supplied to the evaporator and a second decompression unit for dehumidification;

a refrigerant line circulating the refrigerant to the compressor, the first heat exchanger, the first expansion valve, the second heat exchanger, the combination valve unit, and the evaporator;

a first bypass line diverging between the second heat exchanger and the combination valve unit and bypassing the evaporator; and a dehumidification line diverging from the refrigerant line and bypassing the second heat exchanger to supply the refrigerant to the evaporator.

8. The heat pump system according to claim 7, wherein the dehumidification line diverges upstream from the first expansion valve.

9. The heat pump system according to claim 7, further comprising:

a first valve controlling a flow rate of the refrigerant toward the dehumidification line.

10. The heat pump system according to claim 9, wherein the first valve is a ball valve type capable of proportionally controlling opening variables of the dehumidification line.

11. The heat pump system according to claim 7, wherein the refrigerant line and the dehumidification line are connected to different inlets of the combination valve unit.

12. The heat pump system according to claim 7, wherein the first decompression unit for cooling has an expansion passage connected to the refrigerant line of an inlet side of the evaporator to expand the refrigerant, wherein a dehumidification line is connected to the decompression unit for dehumidification, and a bypass passage is disposed such that the refrigerant flowing through the dehumidification line bypasses the expansion passage to be supplied to the evaporator, and wherein an orifice is formed integrally in the bypass passage.

13. The heat pump system according to claim 7, wherein a second valve is disposed at a branch point between the refrigerant line and the first bypass line downstream of the second heat exchanger to control a flow of the refrigerant toward the evaporator and a flow of the refrigerant toward the first bypass line, and Wherein a second bypass line diverging between the second valve and the combination valve unit to bypass the evaporator, and a second expansion valve and a chiller are disposed in the second bypass line.

14. The heat pump system according to claim 7, wherein a heating and dehumidification mode, some of the refrigerant of the refrigerant line passing through the compressor and the first heat exchanger circulates the first expansion valve, the second heat exchanger and the compressor, and some of the refrigerant is expanded while passing through the orifice of the combination valve unit through the dehumidification line, and then, circulates the compressor through the evaporator.

15. A heat pump system for a vehicle which includes:

a compressor compressing and discharging refrigerant; a first heat exchanger radiating heat of the refrigerant discharged from the compressor; a first expansion valve selectively expanding the refrigerant passing through the first heat exchanger; a second heat exchanger exchanging heat between the refrigerant passing through the first expansion valve and a heat medium; an evaporator disposed in an air conditioning case to exchange heat between the refrigerant and air in the air conditioning case; and a combination valve unit having a first decompression unit for cooling the refrigerant to the evaporator and a second decompression unit for dehumidification, the heat pump system comprising:

a refrigerant line circulating the refrigerant to the compressor, the first heat exchanger, the first expansion valve, the second heat exchanger, the combination valve unit, and the evaporator;

a first bypass line diverging between the second heat exchanger and the combination valve unit and bypassing the evaporator; and a dehumidification line diverging from the refrigerant line and bypassing the second heat exchanger to supply the refrigerant to the evaporator, wherein the dehumidification line diverges upstream from the first expansion valve.

\* \* \* \* \*